United States Patent [19]

Buckley

[11] Patent Number: 5,169,571
[45] Date of Patent: Dec. 8, 1992

[54] MAT FORMING PROCESS AND APPARATUS

[75] Inventor: Daniel T. Buckley, Shrewsbury, Vt.

[73] Assignee: The C.A. Lawton Company, DePere, Wis.

[21] Appl. No.: 685,896

[22] Filed: Apr. 16, 1991

[51] Int. Cl.$^5$ .............................................. B29C 67/00
[52] U.S. Cl. ................................. 264/22; 264/128; 264/136; 264/257; 425/174; 425/363; 425/371
[58] Field of Search .................. 264/22, 25, 518, 112, 264/119, 128, 257, 136, 137; 425/174, 174.4, 363, 371, 364 R, 406

[56] References Cited

U.S. PATENT DOCUMENTS

| | | | |
|---|---|---|---|
| 2,560,903 | 7/1951 | Stiefel | 219/47 |
| 3,109,763 | 11/1963 | Finger | 425/174.4 |
| 3,133,825 | 5/1964 | Rubens | 117/62 |
| 3,194,856 | 7/1965 | Palmer | 264/112 |
| 3,258,513 | 6/1966 | Berry et al. | 264/112 |
| 3,287,474 | 11/1986 | Harrington, Jr. | 264/25 |
| 3,622,733 | 11/1971 | Smith et al. | 219/10.55 |
| 3,632,945 | 1/1972 | Johnson | 219/10.55 |
| 3,684,645 | 8/1972 | Temple et al. | 156/296 |
| 3,713,962 | 1/1973 | Ackley | 264/136 |
| 3,878,019 | 4/1975 | Chapman et al. | 264/128 |
| 4,012,553 | 3/1977 | Clemens | 156/272.2 |
| 4,054,713 | 10/1977 | Szkzguchi et al. | 428/285 |
| 4,146,417 | 3/1979 | Drelich et al. | 156/62.2 |
| 4,216,179 | 8/1980 | Lamberts | 264/25 |
| 4,252,592 | 2/1981 | Green | 156/272 |
| 4,372,899 | 2/1983 | Wiemann et al. | 264/25 |
| 4,803,022 | 2/1989 | Barrell et al. | 264/25 |
| 4,911,867 | 3/1990 | Burlet et al. | 264/22 |

FOREIGN PATENT DOCUMENTS 56-167421 12/1981 Japan ................................. 425/174

*Primary Examiner*—Mary Lynn Theisen

[57] ABSTRACT

A mat of reinforcement material, such as glass fiber reinforcement material, is manufactured by forming a layer of continuous strand or chopped fibers on a conveyor belt and conveying the layer along a defined path. At a location downstream of the application of the layer, the layer of fibers is coated with a binder in the range of 2.0-10.0 weight percent, either a microwave-sensitive binder or an ultraviolet-sensitive, binder and the binder-coated layer is fed into a radiation tunnel which includes a compression stage and a curing stage. In this radiation tunnel, the binder-coated layer is compressed to a desired density-thickness ratio and cured, the compression and curing occurring in stages, and the resulting mat is taken from the conveyor belt and wound up for storage. The curing energy is supplied as the selected microwave or ultraviolet radiation and the radiation is applied between sets of compression rollers or through compression rollers or webs which are transparent to the specific electromagnetic energy.

27 Claims, 6 Drawing Sheets

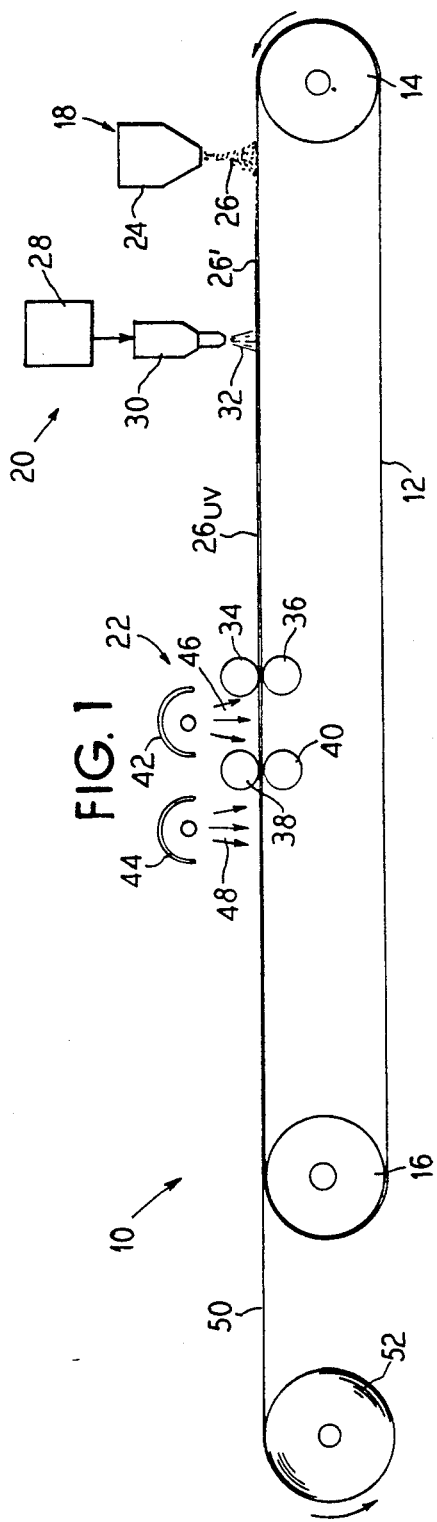
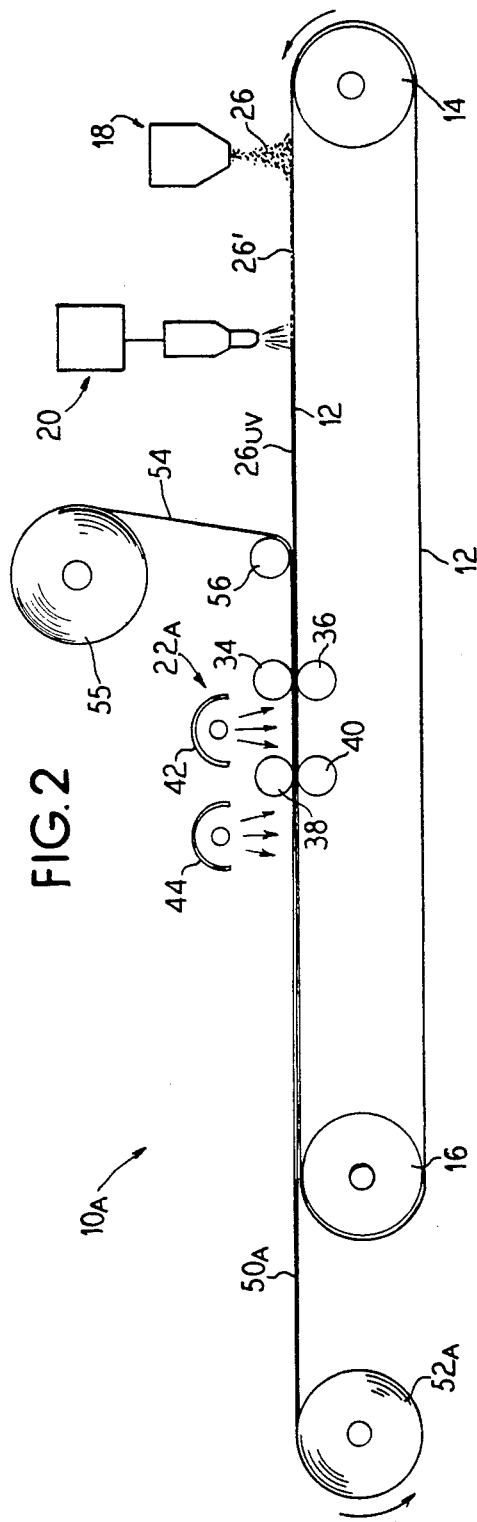

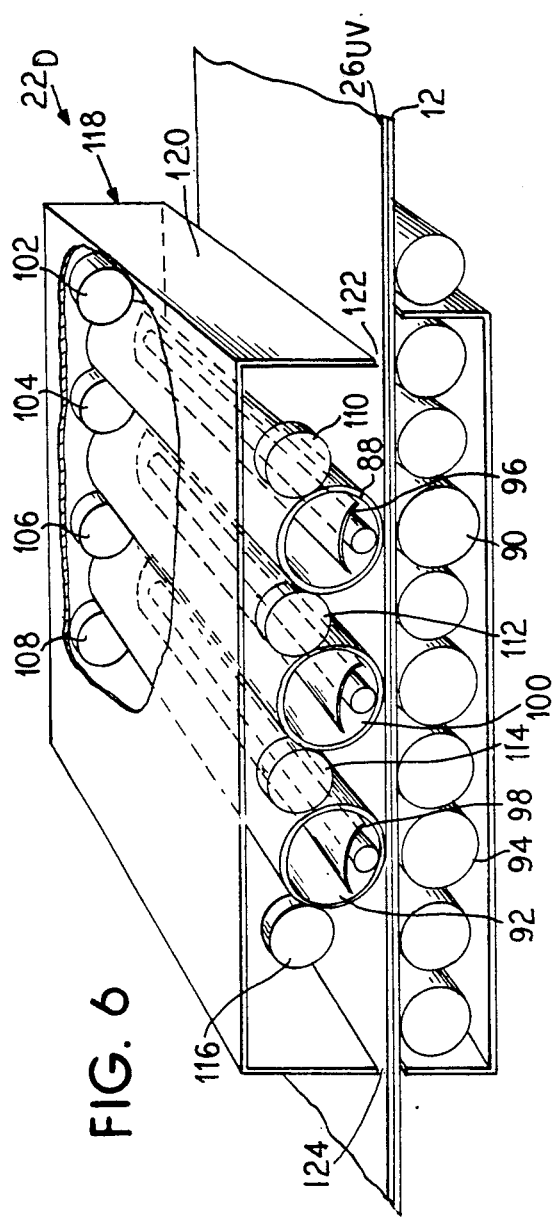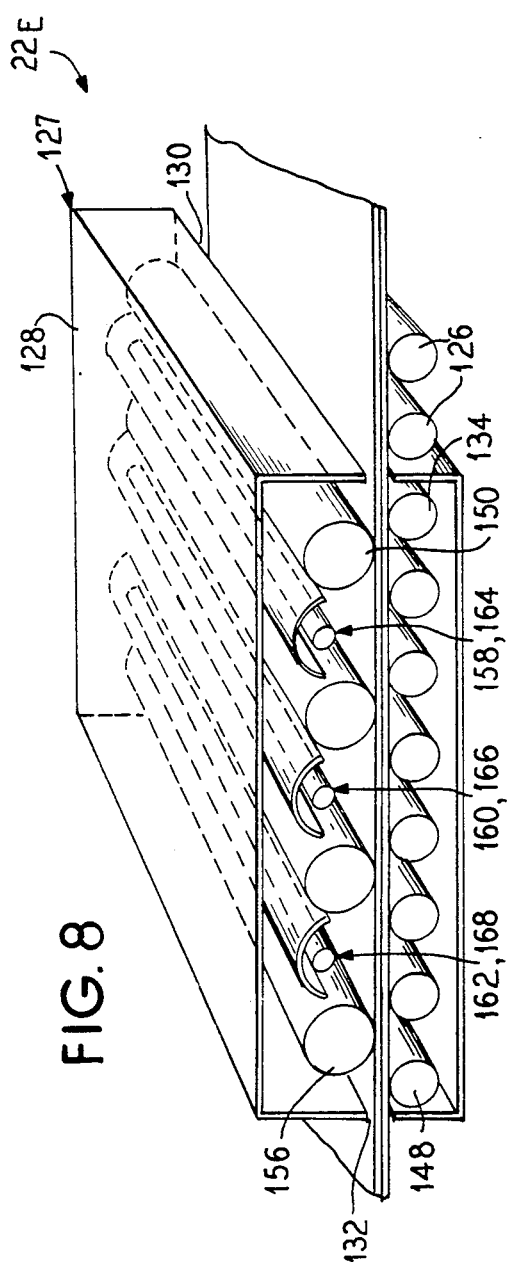

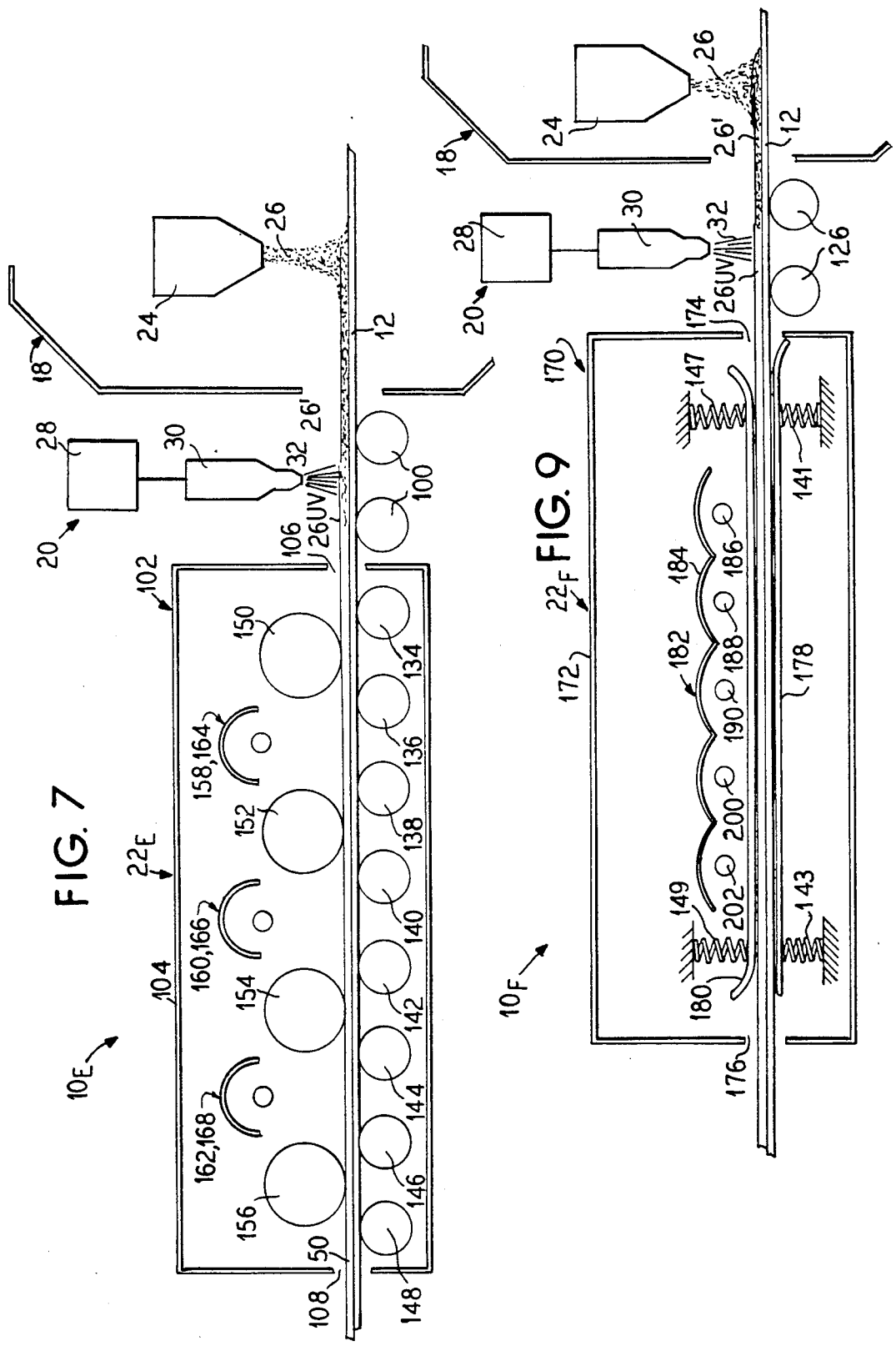

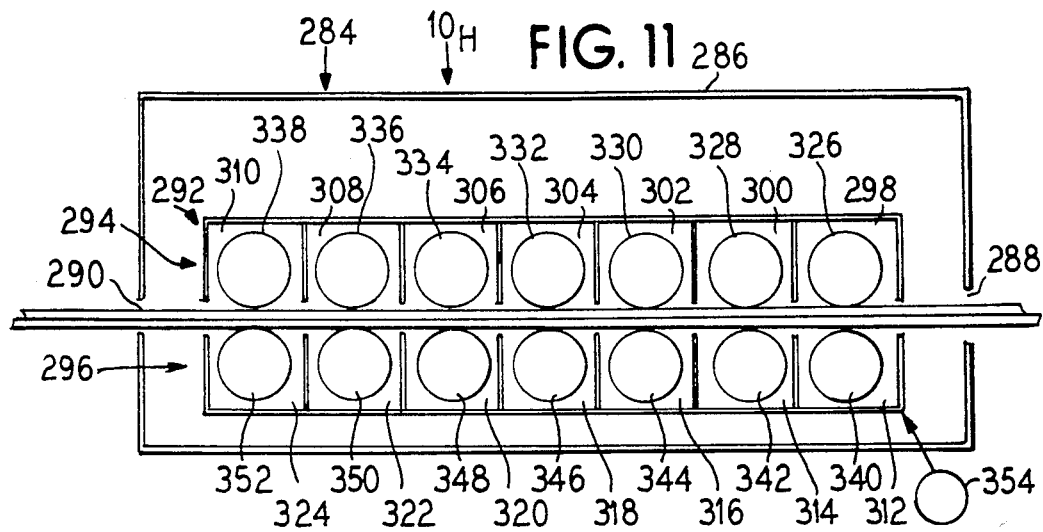
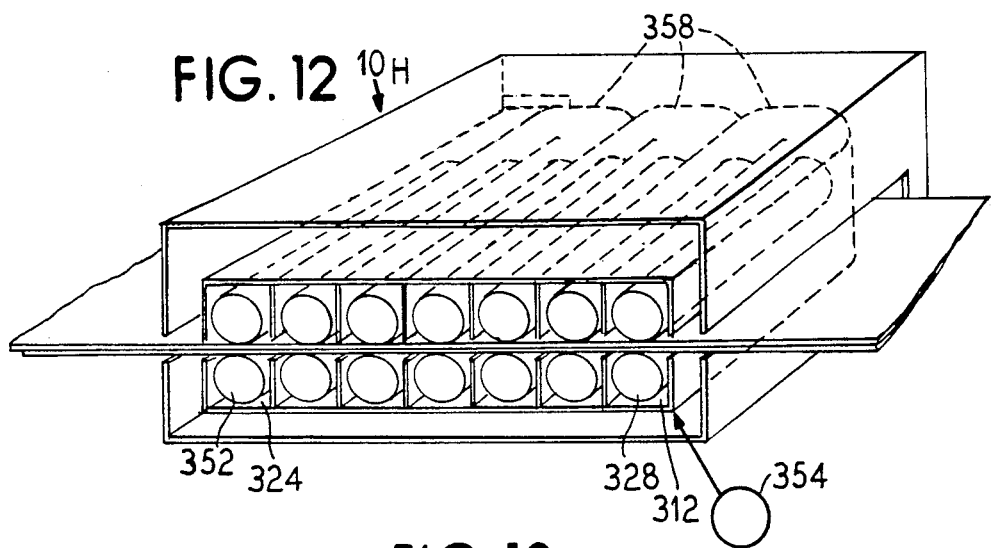
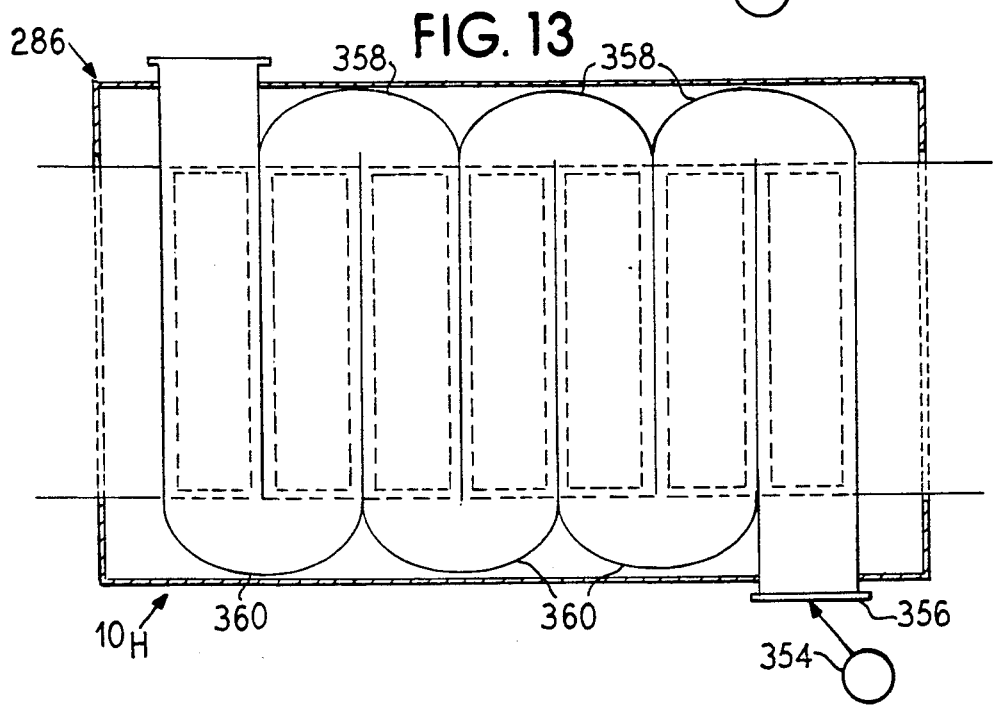

MAT FORMING PROCESS AND APPARATUS

BACKGROUND OF THE INVENTION

1. Field of the Invention

The present invention relates to a process, and to apparatus for carrying out the process, for curing binders on non-woven reinforcing materials, woven reinforcing materials and combinations thereof during their manufacture, and is more particularly concerned with utilizing directed energy which is focused for reaction on the binders without involving the reinforcing materials to a significant degree.

2. Description of the Prior Art

Heretofore, it has been common in the art of manufacturing glass fiber mats, woven materials and other reinforcing materials to apply a binder to both assist in holding the reinforcing material together and promoting a better bond between a matrix resin and the reinforcing material during a subsequent molding process. These binders are usually dry, powder resins, but can be emulsions or liquids. The fiber materials are produced in a conventional manner for the type of construction desired. Normally, the binders are applied to the reinforcements and then subjected to heating, to melt, or dry-before-melt, and sometimes to cure the binders. This process uses significant quantities of energy as the entire mass of reinforcing material needs to be heated to the required melting and/or drying and/or reaction temperatures. The binder can be either unsaturated, cured or staged, depending on application requirements. In this connection, one may refer to U.S. Pat. No. 4,054,713 of Sakaguchi, et al, fully incorporated herein by this reference, particularly to column 4, beginning at line 27.

In conventional systems, many disadvantages are evident such as the large amount of energy required for involving the entire mass of reinforcing material, the size of the ovens required, the time required for heating and cooling and the production of volatiles that must be collected to prevent contamination of the environment.

SUMMARY OF THE INVENTION

It is therefore an object of the present invention to provide an improved mat forming process which is fast, efficient in its energy requirements, and safe from an environmental standpoint.

The above object is achieved, according to the present invention, by providing a process and an apparatus for carrying out the process in which a layer of reinforcing fibers is formed on a traveling web, such as a conveyor belt, binder is applied to coat the layer, for example by spraying or calendaring, the binder-coated layer is compressed to a desired density/thickness ratio, and the binder is cured during compression. The resulting mat is then taken from the web and rolled up.

The binder is selected to be either an ultraviolet energy-curable binder or a microwave energy-curable binder. Accordingly, during curing, the corresponding ultraviolet or microwave energy is applied while the layer is compressed to the desired density/thickness ratio. Here, ultraviolet is considered to be from deep uV ($\approx$200 nm) to visible light ($\approx$450 nm). Combinations of wavelengths may be used to advantage.

As is readily apparent, the process and apparatus of the present invention differs significantly from that heretofore known in the art in that directed energy is used to cure the special binders developed for this process, the binders being sensitive to the directed energy used, either ultraviolet or microwave. The binders can be cured on the fiber with directed energy without involving the mass of fibers in the energy of reaction. The binders are typically oligomers, unsaturated polyesters, epoxides, polyacrylics, polyurethanes, and the like. When cured in accordance with the present invention, the binders have unsaturated sites available for subsequent bonding with matrix resins in molding processes. Using the process of the present invention, the reinforcing material is primarily passive to the activation energy. The reaction takes place without involving the reinforcing materials since the activation energy is targeted only at the binder. The binders perform the same functions as in the conventional manufacturing systems, but can be cured much more rapidly, with significantly less energy and without producing significant volatiles that have to be collected to prevent contamination of the environment. Because there is little or no need to collect the volatiles driven off by heat, there is little or no need for make-up air and little or no need for make-up heat, thereby saving energy and thereby substantially avoiding contamination of the environment.

As mentioned, the directed-energy source can be either ultraviolet light energy or microwave energy as in my co-pending applications, U.S. Ser. No. 446,859 filed Dec. 6, 1989, U.S. Ser. No. 552,253 filed Jul. 12, 1990, and U.S. Ser. No. 609,420, filed Nov. 5, 1990, all relating to the production of three-dimensional preforms using ultraviolet or microwave energy-curable binders and corresponding ultraviolet or microwave energy sources for curing. Contrary to the aforementioned applications, which disclose stepped processes, the present process is continuous.

In the present invention, the preferred energy is ultraviolet light energy due to cost, speed and efficiency. Since the binders are liquid, they do not need to be carried in water to be sprayed. Residual moisture in the reinforcing fibers has long been proven as a cause for reduction of physical and electrical properties with some matrix resins. Because there is no water in the system, there is no required drying and the just-mentioned problem is overcome. Curing by directed energy provides the necessary stiffness and material handling characteristics.

For simplicity, the following description is primarily concerned with non-woven mats, since any process benefits are applicable to any woven reinforcements where binders are used.

Fiber mats come in two general categories, discontinuous fibers called chopped strand mat and continuous fibers generally called continuous strand mat. There are many styles to each of these types of mats. In the process of the present invention, the fiber mats are prepared in the normal manner by the manufacturer, i.e. as a layer of fibers deposited on a moving web, as disclosed in the aforementioned U.S. Pat. No. 4,054,713. The mats are prepared on a continuous web or belt and, upon completion of the layer formation, a binder is applied, typically by spraying, or it can be calendared. This is not a filling or impregnating step. The binder is applied in a range of 2.0–10.0 weight percent, typically in the range of 3.0–7.0 weight percent. After application of the binder, a residence time to allow some wetting of the fibers can be provided by a transport distance to the compression and curing section of the production line.

UV curable resins which may be suitable as binders for particular applications and their suppliers are:

(1) Sartomer SR urethane acrylate manufactured by Adamson Chemical Corp.;
(2) Diacryl oligoester acrylate and Setalux UV epoxy, urethane polyester acrylates manufactured by Akzo Chemie America;
(3) Vectomer 2010, 2015, 2020 urethane acrylates, manufactured by Allied Signal Inc.;
(4) ABCURE urethane acrylate manufactured by American Biltrite Inc.;
(5) Epocryl polyester, urethane, epoxy acrylates manufactured by Cargill UV Products;
(6) Sartomer oligomers manufactured by Chemox Ltd.;
(7) Synocure and Synolac acrylates manufactured by Craynor;
(8) Polyester, urethane and epoxy acrylate resins manufactured by Danicel Chemical Ind. Ltd.;
(9) Urethan acrylates manufactured by Dianippon Ink & Chemical;
(10) EP220100 epoxy acrylate coating resin manufactured by Epolin Inc.;
(11) Jagalux UV Specialty polyesters manufactured by Ernst Jager Fab.;
(12) Photomer 2000 methacrytates, 5000 urethanes, 3000 methacrylates, photomer & Duo-cure acrylates manufactured by Henkel Corp.;
(13) Uvithane urethane acrylates manufactured by Morton International Inc.;
(14) Sartomer urethane, polyester epoxy acrylates, Epoxy 3000, 9500 urethanes manufactured by Sartomer Co.; and
(15) Uvacryl P36, P104, P115, 7100, Uvacryl urethane, epoxy, ester acrylates, silicon acrylates, novacure 3600, available through UCB Radcure Specialties.

It is usually desirable to compress the layers to achieve the proper density/thickness ratio. In the process of the present invention, the layers are compressed in stages and held in compression during staged curing. There are several techniques available for achieving the desired density/thickness ratio by compression using rollers or continuous belts or combinations thereof. For the present application, the method chosen will be determined by the directed energy system employed and the type and style of mats being manufactured.

When using ultraviolet light as the curing energy, light can be applied in several different ways: through a web or continuous belt, between rollers over the belt or web, through the rollers and through the openings between rollers. When the light source is to be contained in the rollers and the light transmitted through the rollers, the rollers can be made of porous metal screen that will allow light transmission or that they can be made of an ultraviolet-transparent material, such as ultraviolet-transparent acrylic or of an ultraviolet-transparent glass or quartz. The belt or web can be made of a porous flexible metal screen that will permit light transmission or it can be made of an ultraviolet-transparent polymer belt or web, such as ultraviolet-transparent polyethylene, ultraviolet-transparent acrylic or ultraviolet-transparent polyvinylchloride. Transparency is relative to the portion of the spectrum in which one is operating. An ultraviolet transparent film can be employed as the web which would also act to keep the uncured binders from the surfaces of the rollers or belts, if desired. It would also keep the potentially-abrasive glass materials from wearing out the surfaces of the transport system. If desired, the ultraviolet-transparent film can be left with the product as a layer separator in the rolls. A further use of this film then can be as a vacuum seal if desired in subsequent cutting or forming applications, such as in my aforementioned preform applications.

The film can also be used as a release film during preforming processes of the type referenced above, when applicable or desired.

The ultraviolet-transparent film can also be continuously stripped off prior to rolling the mats and returned up the line to be used as a continuous web. Ultraviolet-transparent polyethylene is particularly suitable for this purpose in that it has excellent release characteristics, is inexpensive and is produced in a variety of thicknesses.

When using microwave energy as the directed energy source, serpentine waveguides can be employed as in the prior art relating to the drying of webs, veneers and the like. Compression of the materials can be achieved by feeding the mats between two continuous belts or webs that maintain pressure while moving through the serpentine waveguides. Rollers can be placed between or within the parallel sections of the waveguides that extend transversely of the web to maintain pressure on the belts or webs. The rollers will typically be made of a polymer, such as polyethylene, that will have loss characteristics such that the material does not absorb microwave energy and does not attenuate the directed energy. The pressure can also be maintained by having the belts or webs held together (pneumatically, hydraulically, springs, etc) and by having a continuous surface on each half of the waveguide in contact with the belt or web. This continuous surface will be made of a low-friction, low-loss material such as high molecular weight polyethylene or ultra-high molecular weight polyethylene. The belt or web will be similar in material.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation illustrating a transport system and all of the elements for carrying out the method of the invention including the forming of a layer of fibers on a traveling belt, the application of a coating or film of a binder to the layer, and the contemporaneous compressing of the layer and curing of the binder, with the subsequent taking off and rolling up of the finished mat;

FIG. 2 appears on the same sheet with FIG. 1 and is a schematic representation similar to that of FIG. 1 and additionally illustrating the provision of a web which subsequently forms a separating layer on the finished mat;

FIG. 6 is a perspective schematic representation of apparatus of the type illustrated in FIG. 5 showing loading of the compression rollers by way of further rollers;

FIG. 7 is a schematic diagram, along the lines of FIG. 1, showing the deposition of fibers, the application of binder and the contemporaneous compression of the layer and curing of the binder in an ultraviolet tunnel;

FIG. 8 appears on the same sheet as FIG. 6 and is a perspective view of apparatus of the type illustrated in FIG. 7;

FIG. 9 appears on the same sheet as FIG. 7 and is a schematic representation similar to that of FIG. 6 and showing the same basic structure, but in which the compression rollers have been replaced by a pair of pressure supports beneath an elongate ultraviolet light source within the ultraviolet tunnel;

FIG. 11 is a schematic representation of apparatus of the general type illustrated in FIG. 10 showing compression rollers within respective microwave waveguide sections;

FIG. 12 appears on the same sheet as FIG. 11 and is a perspective view of the apparatus of FIG. 11; and FIG. 13 appears on the same sheet as FIG. 11 and FIG. 12 and is a plan view of the apparatus illustrated in FIGS. 11 and 12, shown with the microwave tunnel shown in section as viewed from above.

DESCRIPTION OF THE PREFERRED EMBODIMENTS

Figure 3:
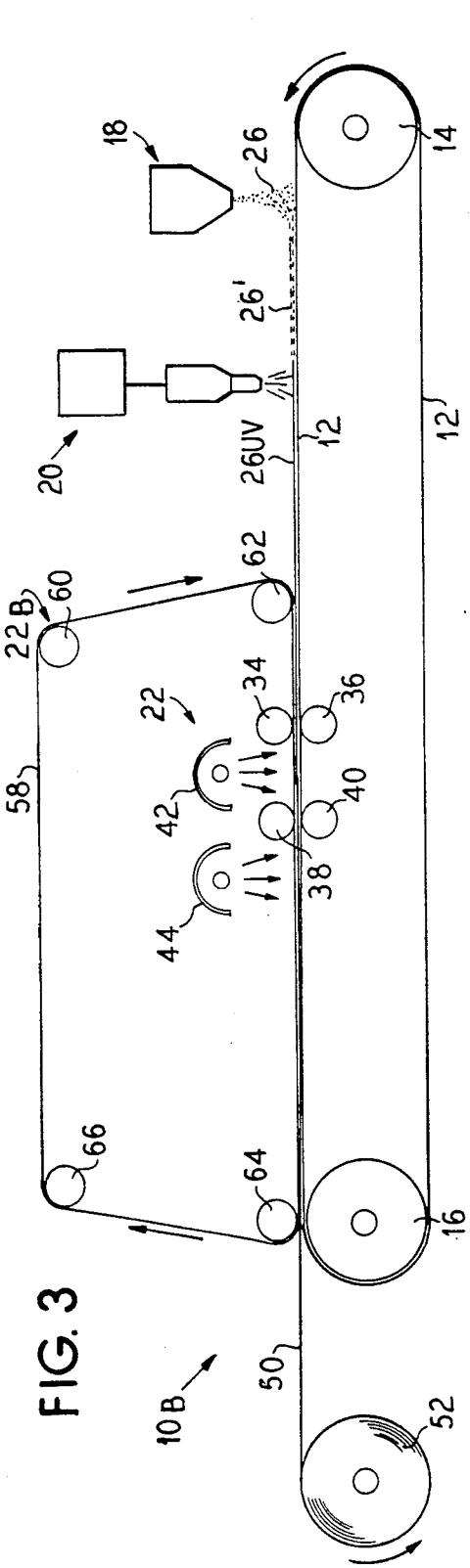
FIG. 3 is another schematic representation, similar to that of FIGS. 1 and 2, and showing the provision of a continuous strippable web which is applied prior to compression and stripped from the mat after curing and before the mat is rolled up.

The invention is applicable to the utilization of different forms of directed energy. Therefore, a detailed description of the use of ultraviolet and microwave directed energy systems will be provided hereinbelow.

Ultraviolet Directed-Energy Applications

Referring to FIG. 1, a mat forming system is generally illustrated at 10 as comprising a plurality of stages spaced along a conveyor belt 12 which is supported for travel along a defined path by a pair of end rollers 14 and 16. The system includes a fiber preparation and application stage 18, a binder applicator 20 and a compression and curing stage 22. At the terminus of the conveyor belt 12, adjacent the roller 16, the formed mat is taken off and rolled up on a take-up or winding roller 52.

At the applicator stage 18, reinforcement fibers, for example either continuous strand or chopped glass fibers, are prepared in a manner known in the art, such as disclosed in the aforementioned U.S. Pat. No. 4,054,713, in the apparatus 24 and deposited, symbolically indicated by the arrow 26, onto the upper surface of the conveyor belt 12 as a layer 26' of fibers. The layer 26' of fibers is then received at the binder applicator station 20 in which binder is drawn from a supply 28, here an ultraviolet energy-curable binder, and applied by way of a sprayer 30 as a spray 32 onto the upper surface of the formed layer 26' to form a binder-coated layer $26_{UV}$ on the upper surface of the conveyor belt 12 with a 2.0–10.0 weight percent of binder. It will therefore be appreciated that the binder is applied, not as a fill, but more as a thin penetrating random disposition of droplets.

The binder-coated layer $26_{UV}$ then passes into the compression and curing stage 22 in which the conveyor belt 12, more particularly the layer $26_{UV}$ carried thereon is compressed between pairs of spaced compression rollers 34–38 where the layer $26_{UV}$ is compressed to a desired density/thickness ratio by the rollers, in stages, and the binder is cured, in stages, by way of the spaced ultraviolet sources 42, 44 which extend transversely of the layer $26_{UV}$ and radiate the same as indicated at 46, 48.

After compression and curing, the finished fiber mat, now referenced 50 is taken from the conveyor belt 12 and rolled up on the wind-up roller 52.

Referring to FIG. 2, a similar system is generally illustrated at $10_A$ in which a compression and curing stage $22_A$ is substantially the same as that illustrated in FIG. 1, but has an additional component in that an ultraviolet-transparent web 54, such as a polyethylene web, is applied to the upper surface of the binder-coated layer $26_{UV}$ from a supply roller 55, the web 54 being guided by way of a guide roller 56. As mentioned above, the ultraviolet-transparent material may be the just-mentioned ultraviolet transparent polyethylene or an ultraviolet-transparent acrylic or the like. As shown in FIG. 2, the web 54 will remain with the ultraviolet binder-coated layer 26 after curing and become part of the finished mat, now referenced $50_A$ and rolled up therewith, as at $52_A$, as a separating layer to provide a vacuum seal, if desired, in subsequent cutting and forming processes, such as disclosed in my aforementioned patent applications.

Referring now to FIG. 3, the same general system is generally illustrated at $10_B$ in which the compression and curing stage $22_B$ is illustrated as being provided with a continuous web 58 of, for example, ultraviolet-transpare polyethylene material as a strippable web which is guided by way of a plurality of rollers 60–66 over a circuitous path from the feed side of the stage $22_B$ through the compression and curing process to be stripped from the resulting cured mat 50 at the guide roller 64 before the mat 50 is rolled up on the wind-up roller 52. Again, an ultraviolet-transparent polyethylene material may be preferred for the web 58 in that, as mentioned, it has excellent release characteristics, is inexpensive and is produced in a variety of thicknesses.

Figure 4:
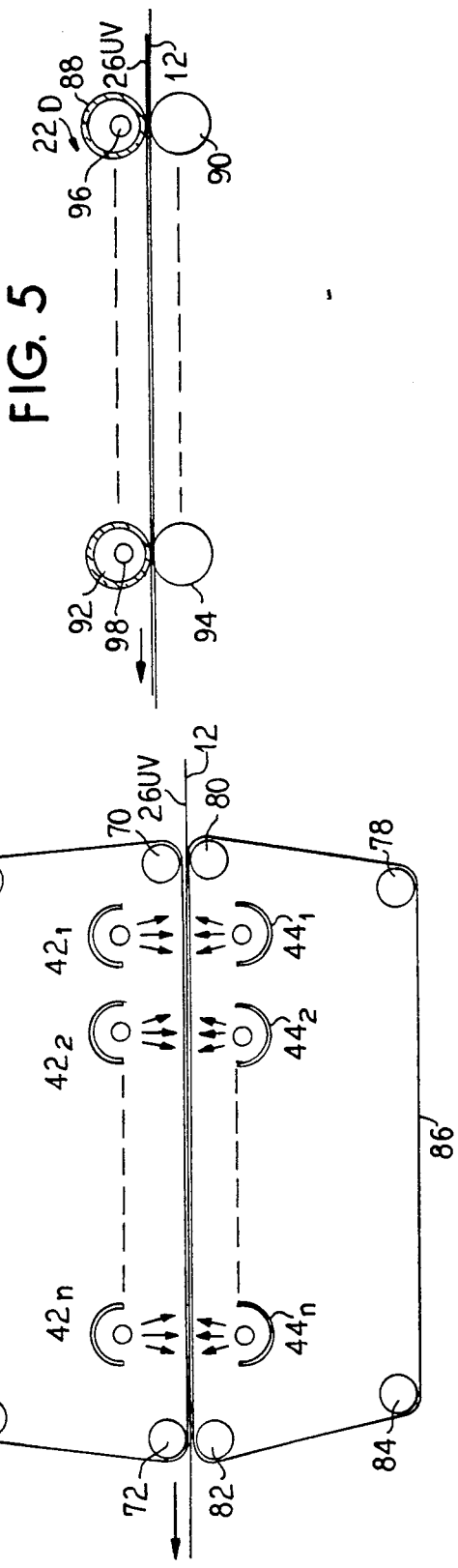
FIG. 4 appears on the same sheet as FIG. 3 and is a schematic representation of the compression and curing area having a pair of continuous webs applied to and stripped from opposite sides of the belt and layer structure.

Referring now to FIG. 4, a further embodiment of a compression and curing stage $22_C$ is illustrated in which the binder-coated layer $26_{UV}$ is fed into the stage $22_C$ between a pair of compression rollers 70 and 80 and exits between a pair of compression rollers 72 and 82. Compression is applied in this stage by way of a pair of ultraviolet-transparent webs 76, 86 which are respectively entrained about sets of guide and/or compression rollers 67–74 and 78–84. Along the defined path in the stage $22_C$, the compressed layer $26_{UV}$ is subjected, during compression, to radiation from a plurality of ultraviolet sources $42_1$–$42_n$ on the upper side of the layer and $44_1$–$44_n$ on the lower side of the layer. In this embodiment, it will be necessary for the conveyor belt 12 to also be transparent to ultraviolet radiation.

Figure 5:
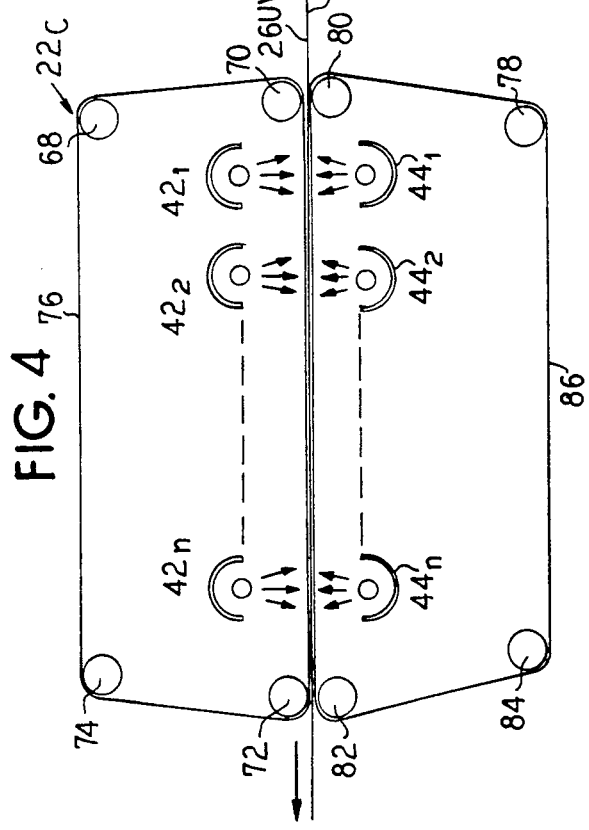
FIG. 5 appears on the same sheet as FIG. 3 and FIG. 4 and is a schematic representation of a further compression and curing stage showing ultraviolet sources located within compression rollers.

FIGS. 5 and 6 illustrate a further compression and curing stage $22_D$ in which the conveyor belt 22 and the binder-coated layer $26_{UV}$ are received between pairs of spaced compression rollers 88, 90–92, 94. In this embodiment in an ultraviolet tunnel 118 and instead of a plurality of spaced ultraviolet sources between rollers, the upper rollers here indicated by the rollers 88 and 92, are transparent to ultraviolet radiation and have the ultraviolet sources 96, 98 mounted therein. In this embodiment, as mentioned, the rollers would be made of a porous metal screen, an ultraviolet-transparent acrylic, an ultraviolet-transparent glass or an ultraviolet-transparent quartz material. Pressure is applied via a further plurality of rollers 102-108 and 110-116.

The system $10_E$ illustrated in FIGS. 7 and 8 is much the same as that illustrated in FIG. 1, with the exception that the compression and curing stage $22_E$ is shown in FIGS. 7 and 8 as comprising an ultraviolet tunnel 102, 127 which comprises a housing 104, 128 having an inlet opening 106, 130 for receiving the belt 12 and the binder-coated layer $26_{UV}$ thereon and an exit opening 108, 132 for delivering the belt 12 carrying the cured layer 50 toward the wind-up station.

The system further comprises a pair of support rollers 126 in the area of the binder application stage 20 and a plurality of support and compression rollers 134-148 for supporting the belt 12 on its underside.

Located above the belt is a plurality of compression rollers 150-156 which are spaced apart along the length of the ultraviolet tunnel 126 and, here, with pairs of the support and compression rollers 134-156 form sets of compression rollers. A plurality of elongate ultraviolet sources 158-168 is located above the binder-coated layer $26_{UV}$ with the individual sources 158, 164; 160, 166 and 162, 168 located between adjacent ones of the upper rollers so as to radiate the layer $26_{UV}$ after compression by the sets of rollers so that the layer $26_{UV}$ is compressed and cured in stages to the desired density/thickness ratio.

Referring to FIG. 9, a similar system $10_F$ is illustrated for ultraviolet curing in which the ultraviolet tunnel 170 again comprises a housing 172 having an inlet opening 174 and an outlet opening 176. In this embodiment, the ultraviolet tunnel includes a pair of pressure plates 178, 180 which are loaded towards one another and receive the conveyor belt 12 and the binder-coated layer $26_{UV}$ therebetween. The pressure loading on the pressure plates 140 and 146 is here symbolically indicated by a plurality of springs 141, 143 and 147, 149. Loading could be provided, however, by way of pneumatic or hydraulic rams or the like to obtain the desired compression along the length of the ultraviolet tunnel 170.

The ultraviolet tunnel 170, in this embodiment, includes an elongate ultraviolet source 182 indicated by a single multi-arched reflector 184 and a plurality of elongate ultraviolet lamps 186-202. Such a light system may also be provided beneath the conveyor given ultraviolet transmissive materials. Again, pressure can be gradually increased from one end of the ultraviolet tunnel to the other by progressive loading to provide the desired staging in the curing process to obtain the desired density/thickness ratio.

Up to this point, only ultraviolet curing has been discussed. The present invention, however, is also fully applicable to curing by way of directed microwave radiation.

Microwave Directed-Energy Applications

Figure 10:
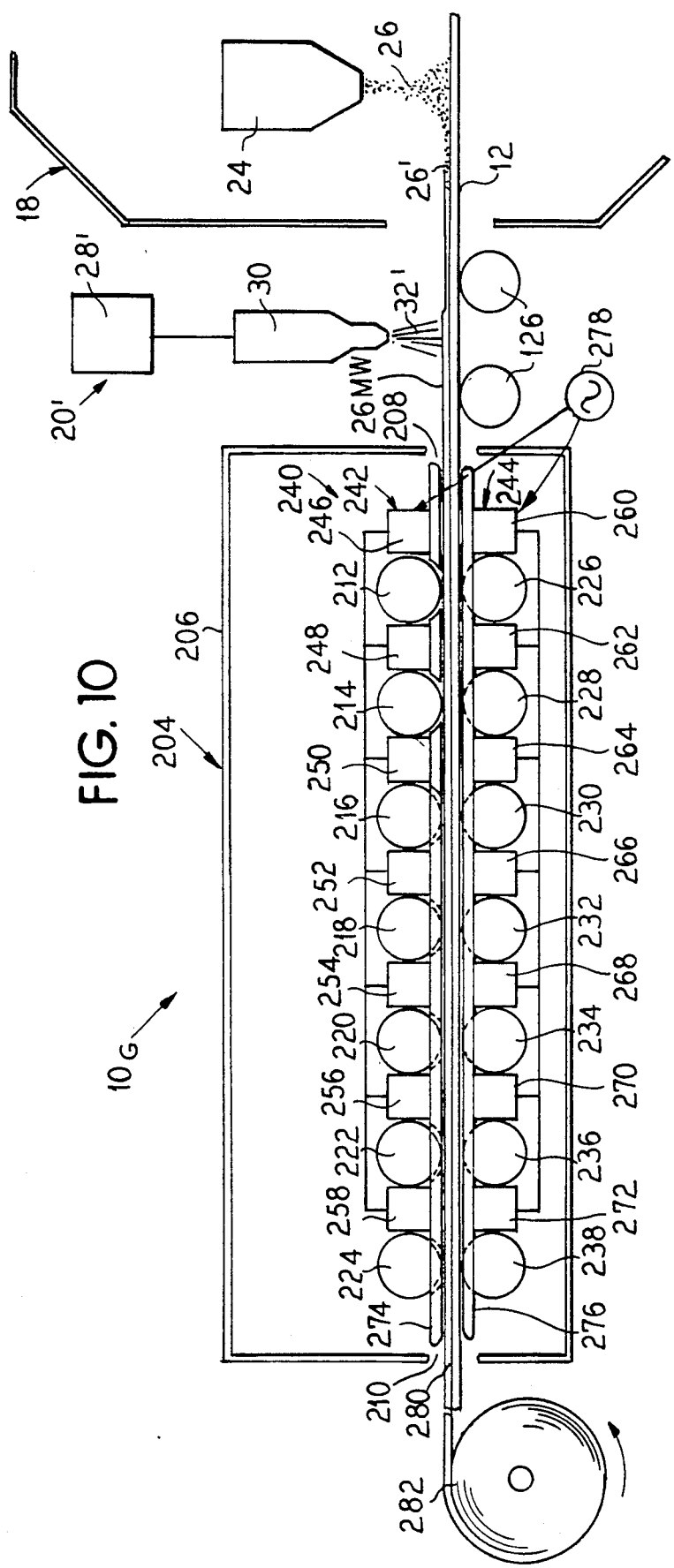
FIG. 10 is a schematic representation of microwave-powered apparatus for practicing the present invention showing compression rollers between microwave waveguide sections.

Referring to FIG. 10, a microwave directed-energy curing system $10_G$ is generally illustrated in the same form as for the ultraviolet energy-curing systems $10-10_F$ discussed above. In the system of FIG. 10, the reinforcement fiber makeup is the same as in the previous systems to provide a layer 26' on the upper surface of the conveyor belt 12. As the conveyor belt 12 moves to the applicator station 20', it is again supported by a pair of support rollers 126 and the layer 26' is provided with microwave energy-curable binder from a supply 28' and a spray nozzle 30 in the form of a spray 32' resulting in a binder-coated layer $26_{MW}$, again with a 2.0-10.0 weight percent of binder, preferably 3.0-7.0 weight percent.

The conveyor belt 12 and the binder-coated layer $26_{MW}$ enter a compression and curing stage $10_G$ which includes, instead of an ultraviolet tunnel, a microwave tunnel 204 having a housing 206 with an inlet opening 208 and an outlet opening 210 much the same as the aforementioend ultraviolet tunnel. Here, a finished mat 280 is fed out for winding on a roller 282.

In the microwave tunnel 204, the conveyor belt 12 and the binder-coated layer $26_{MW}$ are received between a plurality of upper compression rollers 212-224 and a plurality of lower compression rollers 226-238. As shown, the compression rollers are spaced apart along the length of the microwave tunnel 204 and are individually located between adjacent sections of a microwave waveguide 240 including an upper microwave waveguide half 242 and a lower microwave half 244 having a plurality of transverse sections 246-258 on the upper side and a plurality of sections 260-272 on the lower side. The upper and lower halves 242 and 244 together form a split microwave waveguide 240 constructed generally along the lines discussed in my aformentioned patent applications Ser. Nos. 446,859 and 552,253 but without contours for forming a three-dimensional shape. The waveguide 240 is fed by way of a microwave generator 278 and the two halves 242 and 244 and their individual sections 246, 260-258, 272 are separated by a pair of, for example polyethylene members 274, 276 on opposite sides of the waveguide halves, these members sealing the individual waveguide sections from debris. The members 274, 276 also include respective openings for receiving the compression rollers 212-238 therethrough to respectively contact the layer $26_{MW}$ and the belt 12.

Referring to FIG. 11, a microwave directed-energy system is illustrated in the compression and curing stage $10_H$ which comprises a microwave tunnel 284 including a housing 286 having an input opening 288 and an exit opening 290. The microwave tunnel 284 includes therein a microwave waveguide 292 formed by an upper waveguide half 294 and a lower waveguide half 296 which, when mated together, define a channel having communication with the input opening 288 and the exit opening 290.

The upper waveguide half 294 comprises a plurality of half sections 298-310 and the lower waveguide half comprises a plurality of half sections 312-324.

Not shown in FIG. 11, but which may be applied as in FIG. 10, the waveguide structure may also comprise, for example, polyethylene members, such as the members 274, 276 to keep the waveguide sections free of debris. These, if supplied, would also be provided with corresponding apertures for receiving compression rollers therethrough.

As in the structure of FIG. 10, the structure of FIG. 11 also comprises a plurality of compression rollers, here provided in vertical pairs, in the form of a plurality of upper compression rollers 326-338 and a plurality of lower compression rollers 340-352. These compression rollers contact the upper surface of the binder-coated layer $26_{MW}$ and the lower surface of the conveyor belt 12, through the corresponding apertures if the layer 274 and 276 are provided. As before, compression and curing is staged by way of the compression applied via the roller pairs, such as the pair 326, 340 and the contemporaneously-applied microwave radiation by way of the upper and lower waveguide sections.

The waveguide 292, as before, is connected to a source of microwave energy 354 for applying the appropriate microwave frequency to the waveguide 292.

FIGS. 12 and 13 illustrate the same system as FIG. 11 and better show the radiused sections 358, 360 of the waveguide 292. As illustrated, the microwave source 354 is coupled to the waveguide by a waveguide coupling 356.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of making fiber mats, comprising the steps of:
   (a) moving a belt along a defined path;
   (b) continuously depositing a layer of fibers of reinforcing material onto the belt at a first location along the defined path and transporting the layers of fibers on the belt;
   (c) applying a coating of an ultraviolet energy-curable binder to at least one side of the layer of fibers at a second location along the defined path;
   (d) compressing the binder-coated layer of fibers at a third location along the defined path to a predetermined density/thickness ratio;
   (e) holding the binder coated layer under compression to maintain said density/thickness ratio and simultaneously applying ultraviolet radiation to the full area of the compressed binder-coated layer of fibers at a fourth location along the defined path to cure the binder and attach the fibers together to form a mat; and
   (f) winding up the formed mat from the belt.

2. The method of claim 1, and further comprising the step of:
   (g) after the step (c) of applying the binder, and before the step (d) of compressing the layer, moving the belt to transport the binder-coated layer of fibers for a sufficient time interval to allow wetting of the fibers with the binder.

3. The method of claim 1, wherein the step (c) of applying the binder is further defined as:
   (c1) applying the ultraviolet energy-curable binder in a range of 1.0–10.0 weight percent.

4. The method of claim 3, wherein the step (c1) of applying the ultraviolet energy-curable binder in the range of 2.0–10.0 weight percent is further defined as:
   (c1a) applying the ultraviolet energy-curable binder in a range of 3.0–7.0 weight percent.

5. The method of claim 1, and further comprising the step of:
   (g) guiding an an ultraviolet-transparent web along at least that portion of the defined path which includes the third location, to be compassed with the layer of binder-coated fibers.

6. The method of claim 5, wherein the step (f) of winding up the formed mat is further defined as:
   (f1) winding up the ultraviolet-transparent web together with the formed mat.

7. The method of claim 1, and further comprising the steps of:
   (g) guiding an endless ultraviolet-transparent web along at least that portion of the defined path which includes the second location to be compressed with the binder-coated layer of fibers; and
   (h) stripping the ultraviolet-transparent web from the formed mat after the step (e) of radiating the binder-coated layer of fibers.

8. The method of claim 1, wherein the step (d) of compressing and the step (e) of radiating are further defined as:
   (d1) respectively compressing the binder-coated layer with compression elements spaced apart in the direction of web travel; and
   (e1) applying ultraviolet radiation to the binder-coated layer of fibers by (e1a) directing ultraviolet energy onto the binder-coated layer between the spaced compression elements.

9. Apparatus for making a continuous mat of fiber reinforcing material, comprising:
   a continuous moving carrier belt extending along a defined path;
   forming means at a first location along the defined path for forming a layer of reinforcing material on the moving carrier belt;
   applicator means at a second location along the defined path, including means for applying a binder, which binder is curable in response to a predetermined ultraviolet radiation, to at least one surface of the moving layer of the fibers;
   compression means at a third location along the defined path for compressing the binder-coated layer of fibers on the carrier belt to a predetermined density/thickness ratio;
   holding means at a fourth location holding the fibers compressed to said density/thickness ratio and curing means at the fourth location, including radiation means for applying the predetermined ultraviolet radiation to the full area of the binder-coated layer to cure the binder and attach the fibers together to form a mat; and
   winding means for winding up the formed mat from the carrier belt.

10. The apparatus of claim 9, wherein:
    said compression means and said curing means are spaced from said applicator means a distance sufficient to allow wetting of the fibers by the binder prior to and during travel to the compression means and curing means.

11. The apparatus of claim 9, wherein said compression means comprises:
    a plurality of spaced sets of generally opposed rollers, each set of rollers receiving said carrier belt and said binder-coated layer of fibers therebetween.

12. The apparatus of claim 11, wherein said curing means comprises:
    a microwave generator; and
    a serpentine waveguide coupled to said microwave generator and including a plurality of waveguide sections each extending transversely of said defined path between respective adjacent sets of rollers and each including a slot for receiving therethrough said carrier belt and said binder-coated layer of fibers carried thereon.

13. The apparatus of claim 11, wherein said curing means comprises:
an ultraviolet energy source; and
radiation means directing the ultraviolet energy of said source between adjacent sets of said rollers onto said binder-coated layer of fibers.

14. Apparatus for making a continuous mat of fiber reinforcing material, comprising:
a continuous moving carrier belt extending along a defined path;
forming means at a first location along the defined path for forming a layer of reinforcing material on the moving carrier belt;
applicator means at a second location along the defined path, including means for applying a binder, which binder is curable in response to a predetermined ultraviolet radiation, to at least one surface of the moving layer of the fibers;
compression means at a third location along the defined path for compressing the binder-coated layer of fibers on the carrier belt to a predetermined density/thickness ratio;
holding means at a fourth location holding the fibers compressed to said density/thickness ratio and curing means at the fourth location, including radiation means for applying the predetermined ultraviolet radiation to the full area of the binder-coated layer to cure the binder and attach the fibers together to form a mat;
winding means for winding up the formed mat from the carrier belt;
said compression means including a plurality of spaced sets of generally opposed rollers, each set of rollers receiving said carrier belt and said binder coated layer of fibers therebetween;
at least one of said rollers of each set is transparent to ultraviolet radiation; and
said curing means comprises an ultraviolet energy source in said at least one roller of each set for radiating said binder-coated layer of fibers through said at least one roller.

15. The apparatus of claim 14, wherein:
said at least one roller of each set comprises ultraviolet-transparent acrylic material.

16. The apparatus of claim 14, wherein:
said at least one roller of each set comprises ultraviolet-transparent glass material.

17. The apparatus of claim 14, wherein:
said at least one roller comprises ultraviolet-transparent quartz material.

18. The apparatus of claim 11, wherein:
said carrier belt is transmissive to ultraviolet radiation; and
said curing means comprises a source of ultraviolet energy for radiating said binder-coated layer of fibers through said carrier belt.

19. The apparatus of claim 9, wherein:
said compression means comprises a pair of superposed moving webs receiving said belt and said binder-coated layer of fibers therebetween.

20. The apparatus of claim 19, wherein:
said application means comprises a supply of microwave energy-curable binder; and
said curing means comprises a serpentine waveguide including a plurality of slotted waveguide sections extending transversely of and receiving said superposed webs and said carrier belt and said binder-coated layer of fibers therethrough, and a source of microwave energy coupled to said waveguide for providing curing microwave energy to be directed onto said binder-coated layer of fibers.

21. The apparatus of claim 19, wherein:
at least one of said superposed webs comprises ultraviolet-transparent material; and said curing means comprises at least one ultraviolet source radiating said binder-coated layer of fibers through said at least one web.

22. The apparatus of claim 12, wherein said serpentine waveguide comprises:
an upper waveguide half above said binder-coated layer or said belt and including a plurality of elongate walls connected in sets of three walls in which one of said three walls connects and¹is generally perpendicular to the others of said three walls to define an upper waveguide half section, and a first microwave-transparent panel extending across said others of said walls to physically close of each of said upper waveguide half sections; and
a lower waveguide half below said belt carrying said binder-coated layer and including a plurality of elongate walls connected in sets of three walls in which one of said three walls connects and is generally perpendicular to the others of said three walls to define a lower waveguide half section, and a second microwave-transparent panel extending across said others of said walls to physically close each of said lower waveguide half sections,
said upper and lower waveguide sections spaced to define a slot between said first and second microwave-transparent panels for receiving said belt carrying said binder-coated layer therethrough.

23. The apparatus of claim 12, wherein:
said curing means comprises a microwave generator, and a split microwave waveguide comprising first and second waveguide halves each including a plurality of U-shaped waveguide half sections extending spaced apart parallel to one another transversely of said conveyer belt aligned with the waveguide half sections of the other half of said waveguide, and first and second microwave-transparent panels each including opening therethrough and extending across the waveguide half section of a respective half of said waveguide, said first and second microwave-transparent panels spaced to define a slot through said split microwave waveguide for receiving said conveyor belt carrying said binder-coated layer therethrough; and
said compression means comprises a plurality of microwave transparent rollers each mounted in a respective waveguide half section and extending through a respective opening in a respective one of said first and second microwave transparent panels.

24. Apparatus for making a continuous mat of fiber reinforcing material, comprising:
a continuous moving carrier belt extending along a defined path; forming means at a first location along the defined path for forming a layer of reinforcing material on the moving carrier belt;
applicator means at a second location along the defined path, including means for applying a binder, which binder is curable in response to a predetermined ultraviolet radiation, to at least one surface of the moving layer of the fibers;

compression means at a third location along the defined path for compressing the binder-coated layer of fibers on the carrier belt to a predetermined density/thickness ratio;

holding means at a fourth location holding the fibers compressed to said density/thickness ratio and curing means at the fourth location, including radiation means for applying the predetermined ultraviolet radiation to the full area of the binder-coated layer to cure the binder and attach the fibers together to form a mat;

winding means for winding up the formed mat from the carrier belt; and said compression means comprising a plurality of sets of compression rollers, each of said sets including first and second opposed rollers for receiving said carrier belt and said binder-coated layer therebetween, each of said first and second opposed rollers being transparent to ultraviolet radiation.

25. Apparatus for making a continuous mat of fiber reinforcing material, comprising:

transport means including a carrier belt extending along a defined path from an origin to a terminus;

a make-up station at a first location downstream of and adjacent said origin including charging means for depositing a layer of fibers of reinforcing material onto said carrier belt;

an applicator station on said defined path at a second location downstream of said make-up station, including a supply of ultraviolet energy-curable binder and spray means for spraying a coating of said binder onto a surface of said layer of fibers;

a curing station on said defined path downstream of said applicator station, including a tunnel receiving said carrier belt and binder-coated of fibers therethrough, compression means in said tunnel for compressing said binder-coated layer of fibers to a predetermined density/thickness ratio, holding means holding said fibers compressed to said density/thickness ratio and a source of ultraviolet energy in said tunnel for radiating the full area of said held compressed binder-coated layer of fibers with curing ultraviolet energy during compression thereof to cure said binder and attach said fibers together to form a mat of fiber reinforcing material having said predetermined density/thickness ratio; and a winding station of said terminus of said defined path for winding up the formed mat from the carrier belt.

26. A method of making fiber mats, comprising the steps of:
(a) moving a belt along a defined path;
(b) continuously depositing a layer of fibers of reinforcing material onto the belt at a first location along the defined path and transporting the layers of fibers on the belt;
(c) applying a coating of an electromagnetic energy-curable binder to at least one side of the layer of fibers at a second location along the defined path;
(d) compressing the binder-coated layer of fibers at a third location along the defined path to a predetermined density/thickness ratio;
(e) holding the binder coated layer under compression to maintain said density/thickness ratio and simultaneously applying electromagnetic energy radiation to the full area of the compressed binder-coated layer of fibers at a fourth location along the defined path to cure the binder and attach the fibers together to form a mat; and
(f) winding up the formed mat from the belt.

27. Apparatus for making a continuous mat of fiber reinforcing material, comprising:

a continuous moving carrier belt extending along a defined path;

forming means at a first location along the defined path for forming a layer of reinforcing material on the moving carrier belt;

applicator means at a second location along the defined path, including means for applying a binder, which binder is curable in response to a predetermined electromagnetic radiation, to at least one surface of the moving layer of the fibers;

compression means at a third location along the defined path for compressing the binder-coated layer of fibers on the carrier belt to a predetermined density/thickness ratio;

holding means at a fourth location holding the fibers compressed to said density/thickness ratio and curing means at the fourth location, including radiation means for applying the predetermined electromagnetic radiation to the full area of the binder-coated layer to cure the binder and attach the fibers togethers to form a mat; and winding means for winding up the formed mat from the carrier belt.

* * * * *